United States Patent
Hoffmann et al.

[11] Patent Number: 6,016,040
[45] Date of Patent: Jan. 18, 2000

[54] DEVICE AND METHOD FOR DRIVING AT LEAST ONE CAPACITIVE ACTUATOR

[75] Inventors: Christian Hoffmann, Regensburg; Hellmut Freudenberg, Grossberg; Hartmut Gerken, Nittendorf; Martin Hecker, Laimerstadt; Richard Pirkl, Regensburg, all of Germany

[73] Assignee: Siemens Aktiengesellschaft, Munich, Germany

[21] Appl. No.: 09/250,865

[22] Filed: Feb. 16, 1999

Related U.S. Application Data

[63] Continuation of application No. PCT/DE97/01540, Jul. 22, 1997.

[30] Foreign Application Priority Data

Aug. 14, 1996 [DE] Germany .......................... 196 32 837

[51] Int. Cl.[7] .................................................. H01L 41/08
[52] U.S. Cl. .......................... 318/116; 310/316; 310/317
[58] Field of Search .................................. 310/316, 317; 318/116; 323/201, 326, 371

[56] References Cited

U.S. PATENT DOCUMENTS

| | | | |
|---|---|---|---|
| 5,130,598 | 7/1992 | Verheyen et al. | 310/316 |
| 5,204,576 | 4/1993 | Mitsuyasu | 310/317 |
| 5,245,242 | 9/1993 | Hall | 310/316 |

FOREIGN PATENT DOCUMENTS

| | | |
|---|---|---|
| 0 464 443 A1 | 1/1992 | European Pat. Off. |
| 36 21 541 A1 | 1/1987 | Germany . |

*Primary Examiner*—Nestor Ramirez
*Assistant Examiner*—Judson H. Jones
*Attorney, Agent, or Firm*—Herbert L. Lerner; Laurence A. Greenberg

[57] ABSTRACT

A device for driving at least one capacitive actuator contains a charge capacitor C1 and a discharge capacitor C2. According to the method, the actuator is charged with a desired voltage $U_s$ by the capacitors C1+C2 connected in series, and is then discharged into the discharge capacitor C2. The charge capacitor is then recharged to a voltage $U_{C1}=U_s-U_{C2}$ by a voltage source which can be regulated.

13 Claims, 3 Drawing Sheets

DEVICE AND METHOD FOR DRIVING AT LEAST ONE CAPACITIVE ACTUATOR

CROSS-REFERENCE TO RELATED APPLICATION

This application is a continuation of copending International application No. PCT/DE97/01540, filed Jul. 22, 1997, which designated the United States.

BACKGROUND OF THE INVENTION

FIELD OF THE INVENTION

The invention relates to a device for driving at least one capacitive actuator, in particular a piezoelectrically operated fuel injection valve of an internal combustion engine, by a control circuit. The invention also relates to a method for operating the device.

Published, European Patent Application EP 0 464 443 A1 discloses a piezo actuator which is charged from a capacitor via a charge coil. A portion of the energy applied is fed back into the capacitor via a discharge coil during the discharging of the piezo actuator, while the last portion is destroyed by short-circuiting, likewise via the discharge coil. During the discharging, a negative voltage is applied to the piezo actuator.

Published, Non-Prosecuted German Patent Application DE 36 21 541 A1 discloses a driver circuit for a piezo actuator of a fuel injection valve which is charged via a series circuit, connected to a voltage source and includes two capacitors, and via a charge coil, and is discharged into one of the two capacitors via a discharge coil. In an alternative embodiment, the actuator is charged via a capacitor, connected to a voltage source, and a charge coil. During the discharging, the energy stored in the piezo actuator is destroyed via a discharge coil.

SUMMARY OF THE INVENTION

It is accordingly an object of the invention to provide a device and a method for driving at least one capacitive actuator that overcome the above-mentioned disadvantages of the prior art devices and methods of this general type, which operates with as little loss as possible and is of simple construction for driving at least one capacitive actuator at which no negative voltage is to occur.

With the foregoing and other objects in view there is provided, in accordance with the invention, in combination with a control circuit, a device for driving at least one capacitive actuator and controlled by the control circuit, including: an earth potential-free voltage source regulated by the control circuit and having a positive pole and a negative pole; a charge capacitor disposed between the positive pole and the negative pole and being charged by the earth potential-free voltage source; a first series circuit disposed in parallel with the charge capacitor and including a charge switch connected to the positive pole through which current can flow away from the positive pole and a discharge switch connected to the negative pole through which current can flow to the negative pole; an earth connection; a recharge capacitor disposed between the negative pole and the earth connection; a ring-around coil having a first side connected to a node connection point of the charge switch and the discharge switch and a second side to be connected to an actuator to be driven; a controlled power MOSFET switch having a first side connected to the earth connection and a second side to be connected to the actuator to be driven, the controlled power MOSFET switch and the actuator defining a second series circuit; at least one further controlled power MOSFET having a first side connected to the earth connection and a second side to be connected to a first side of at least one further actuator, the second side of the ring-around coil to be connected to a second side of the at least one further actuator, the at least one further controlled power MOSFET switch and the at least one further actuator defining a third series circuit connected in parallel with the second series circuit; and a diode disposed between the second side of the ring-around coil and the earth connection and through which current can flow from the earth connection to the ring-around coil.

It is advantageous, inter alia, that the voltage source can be configured for an output voltage which is less than the charge voltage for the actuator, and that each actuator is charged and discharged with a complete sinusoidal halfwave of the current. As a result, the actuator reaches its operating voltage, and thus its final range at a "slow" speed (at the maximum value of a cosine oscillation). As a result, in the frequency range only frequencies arise which are below a fundamental frequency of at maximum 300 Hz, during the operation of a piezoelectrically operated fuel injection valve, as a result of which hardly any EMC problems arise. The actuator is easily charged by regulating the voltage of the voltage source, for example of a switched-mode power supply. No recharging elements are required either, since the voltage source is always connected to the charge capacitor. Furthermore, the ring-around coil having a housing provided for the circuit can be moved closer to the actuators, since there is no switch disposed between it and the actuators.

With the foregoing and other objects in view there is also provided, in accordance with the invention, in combination with a control circuit, a device controlled by the control circuit and driving a piezoelectrically operated fuel injection valve of an internal combustion engine, including: an earth potential-free voltage source regulated by the control circuit and having a positive pole and a negative pole; a charge capacitor disposed between the positive pole and the negative pole and being charged by the earth potential-free voltage source; a first series circuit disposed in parallel with the charge capacitor and including a charge switch connected to the positive pole through which current can flow away from the positive pole and a discharge switch connected to the negative pole through which current can flow to the negative pole; an earth connection; a recharge capacitor disposed between the negative pole and the earth connection; a second series circuit disposed between a node connection point of the charge switch and the discharge switch and the earth connection, the second series circuit including a ring-around coil having a first side and a second side, an actuator connected to the second side of the ring-around coil and driving the fuel injection valve, and a controlled power MOSFET switch connected to the actuator, the actuator connected in series with the controlled power MOSFET switch defining a third series circuit; a fourth series circuit connected in parallel with the third series circuit, the fourth series circuit including at least one further controlled power MOSFET and at least one further actuator connected in series with the at least one further controlled power MOSFET; and a diode disposed between the second side of the ring-around coil and the earth connection and through which current can flow from the earth connection to the ring-around coil.

With the foregoing and other objects in view there is further provided, in accordance with the invention, in combination with a control circuit, a device controlled by the control circuit for driving at least one capacitive actuator, including: a voltage source regulated by the control circuit and having a positive pole and an earth connection; a charge capacitor disposed between the positive pole and the earth connection and being charged by the voltage source; a first series circuit disposed in parallel with the charge capacitor and including a charge switch connected to the positive pole and through which current can flow away from the positive pole and a discharge switch having a first side connected to the charge switch and a second side connected to the earth connection and through which current can flow to the earth connection; a ring-around coil having a first side and a second side; a recharge capacitor disposed between a node connection point of the charge switch and the discharge switch and the first side of the ring-around coil; a controlled power MOSFET switch having a first side connected to the earth connection and a second side to be connected to a first side of an actuator to be driven, a second side of the actuator to be connected to the second side of the ring-around coil, the controlled power MOSFET and the actuator defining a second series circuit; at least one further controlled power MOSFET having a first side connected to the earth connection and a second side to be connected to a first side of at least one further actuator, a second side of the at least one further actuator to be connected to the second side of the ring-around coil; and a diode connected between the earth connection and the second side of the ring-around coil and through which current can flow from the earth connection to the ring-around coil.

With the foregoing and other objects in view there is additionally provided, in accordance with the invention, a method for operating the above-identified devices, which includes: charging a respective actuator via the ring-around coil with a prescribed desired voltage from a series circuit of the charge capacitor and of the recharge capacitor; discharging the respective actuator into the recharge capacitor; and charging the charge capacitor, before a next charge cycle, to a voltage level corresponding to a difference between a desired voltage and a voltage at the recharge capacitor.

Other features which are considered as characteristic for the invention are set forth in the appended claims.

Although the invention is illustrated and described herein as embodied in a device and a method for driving at least one capacitive actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
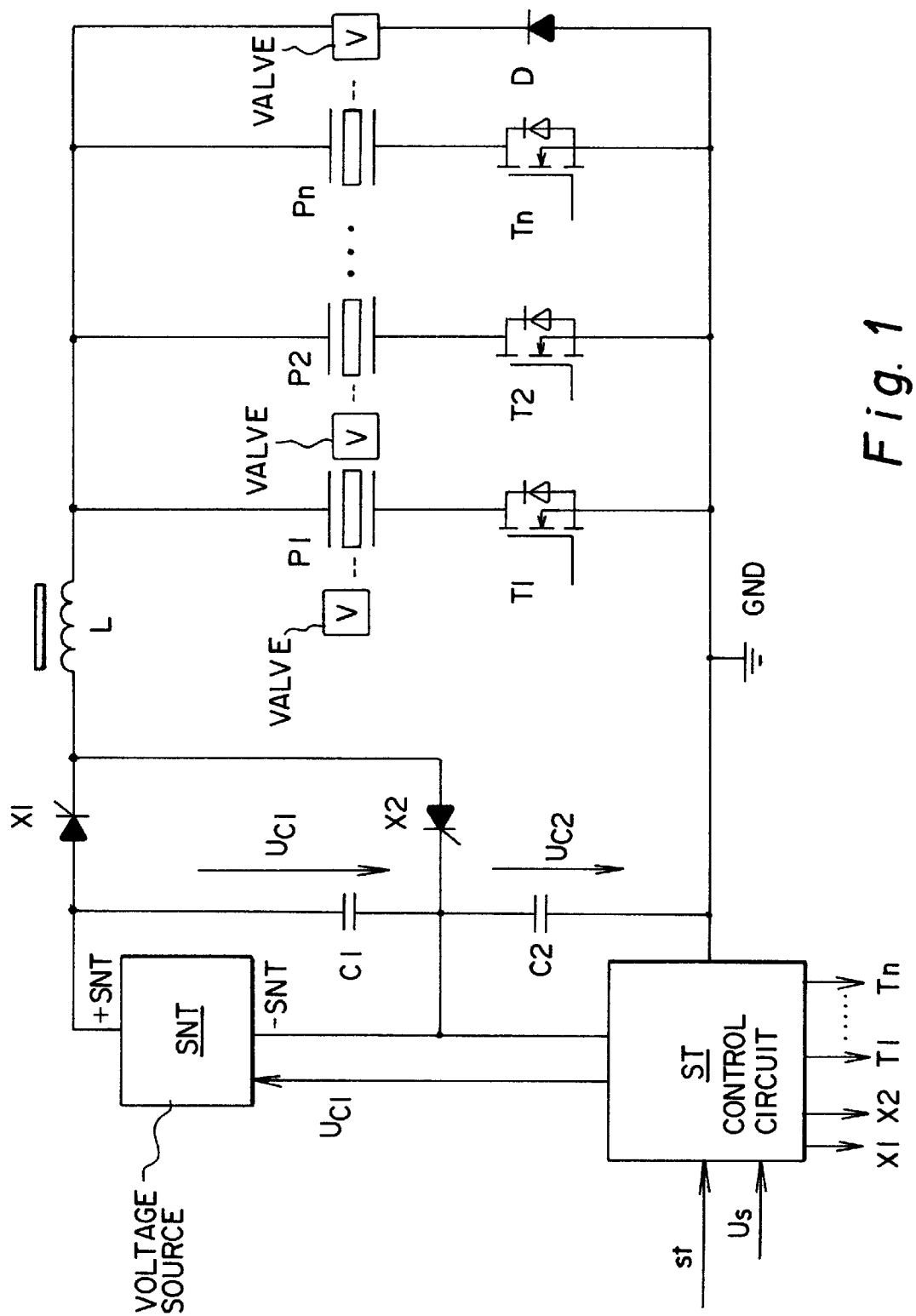
FIG. 1 is a diagrammatic circuit diagram of a first exemplary embodiment of a circuit according to the invention.

In all the figures of the drawing, sub-features and integral parts that correspond to one another bear the same reference symbol in each case. Referring now to the figures of the drawing in detail and first, particularly, to FIG. 1 thereof, there is shown a circuit of a first exemplary embodiment according to the invention for driving n fuel injection valves V of a non-illustrated internal combustion engine via piezoelectric actuators P1 to Pn by a control circuit ST, which is part of a microprocessor-controlled engine control unit.

A charge capacitor C1 is disposed between a positive pole +SNT and a negative pole −SNT of a regulated, earth potential-free voltage source SNT, preferably a switched-mode power supply. Disposed parallel with the charge capacitor C1 is a series circuit including a charge switch X1, which is connected to the positive pole +SNT and through which current can flow away from the positive pole +SNT, and a discharge switch X2, which is connected to the negative pole −SNT and through which current can flow to the negative pole −SNT.

Switches X1 and X2 are electronic switches, through which current can flow in only one direction and which include at least one semiconductor element, the switches X1, X2 preferably being thyristor switches which are energized by the control circuit ST.

A recharge capacitor C2 is disposed between the earth potential-free negative pole −SNT of the switched-mode power supply and an earth connection GND of the circuit.

A series circuit including a ring-around coil L, connected to the charge switch X1, an actuator P1 and a controlled power MOSFET switch T1 lies between the connection point of the charge switch X1 and discharge switch X2 and an earth connection GND.

Disposed parallel to the series circuit including the actuator P1 and the power MOSFET switch T1 is a diode D through which current can flow from the earth connection GND to the ring-around coil L.

For each further actuator P2 to Pn, a series circuit including the further actuator and a further power MOSFET switch T2 to Tn is connected in parallel with the series circuit including the actuator P1 and the power MOSFET switch T1.

Power MOSFET switches usually contain inverse diodes whose function is, as explained in more detail below, utilized during the operation of the device according to the invention.

The switches X1, X2 and T1 to Tn are controlled by the control circuit ST, as a function of control signals st of the engine control unit, of a desired value $U_s$ for the voltage with which the actuators P1 to Pn are to be charged, the desired value $U_s$ being, in the exemplary embodiment, stored in the control circuit ST or fed to it by the engine control unit, and of the actual value $U_{C2}$ of a voltage at the recharge capacitor C2. The connection of the unearthed negative pole −SNT serves at the same time as a voltage measuring point for the voltage $U_{C2}$ which is applied to the recharge capacitor C2. The charge capacitor C1 can be considered as an output capacitor of the switched-mode power supply SNT.

Figure 2:
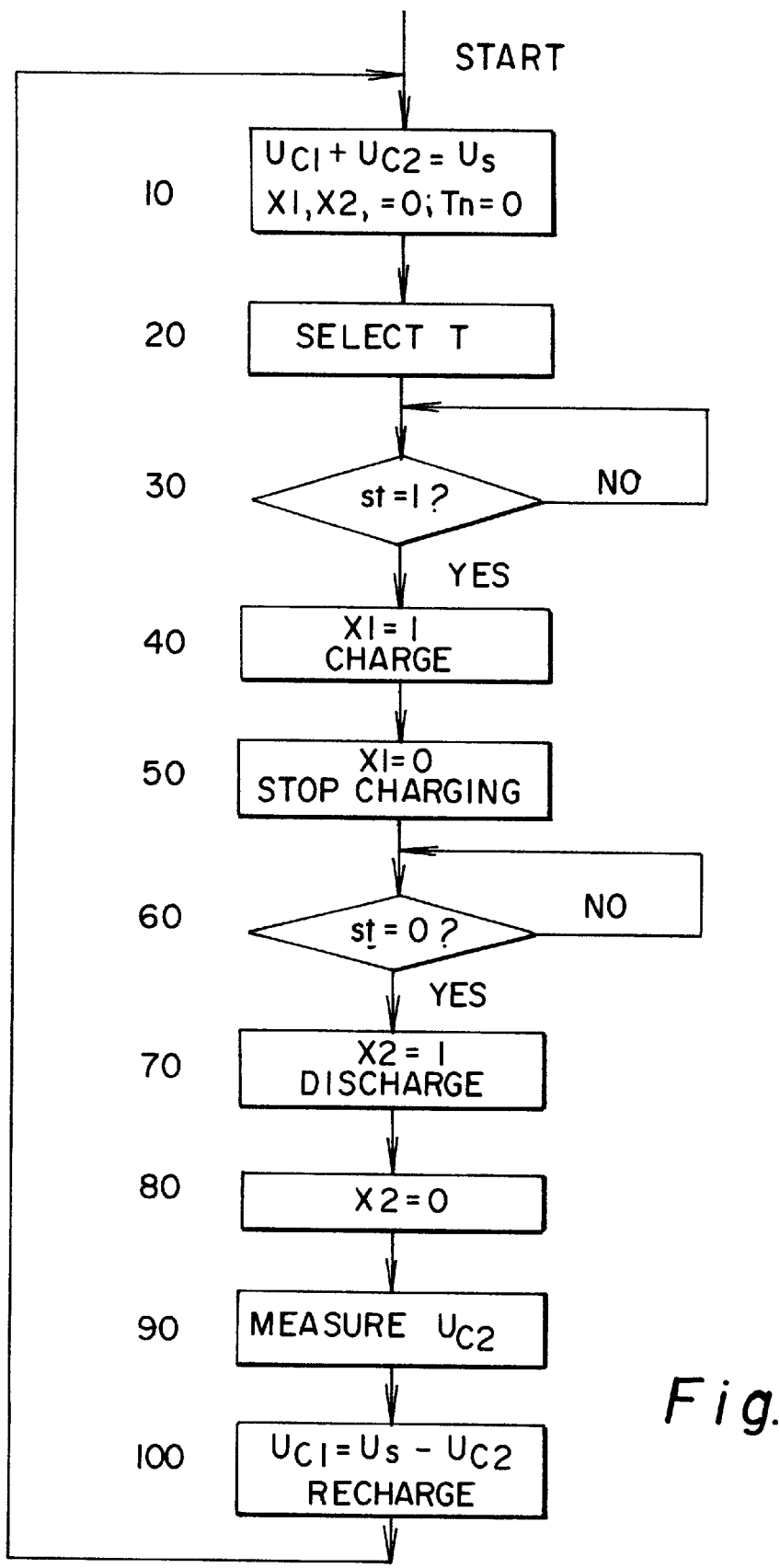
FIG. 2 is a flow chart of the operation of the circuit.

A method for operating the described device is explained in more detail below with reference to FIG. 2. Starting from a state or step 10, in which, for example, the charge capacitor C1 is charged to $U_{C1}$=+60V and the recharge capacitor C2 is charged to $U_{C2}$=+100V, therefore together in a series circuit having a desired voltage $U_s$=+160V, the ring-around coil L is de-energized, all the switches X1, X2 and T1 to Tn are non-conductive (high impedance) and all the actuators P1 to Pn are discharged. The actuator P1 is to be activated in order to inject fuel into a cylinder via the assigned injection valve V. The value of the desired voltage $U_s$ is stored in the control circuit ST or is prescribed to it by the engine control unit.

Initially, the control circuit ST selects the appropriate actuator in a step 20 by energizing the power MOSFET switch T1 assigned to it. T1 can remain energized (low impedance) over a crankshaft angle CA=720° CA/N (N=number of cylinders), this is for example 180° CA in the case of four-cylinder engines and 120° CA in the case of six-cylinder engines.

At the start of injection, which is prescribed by the start of the control signal st at step 30, the charge switch X1 is triggered in a step 40 by the control circuit ST. As a result, the control circuit ST discharges the voltage $U_s$=+160V applied by the series circuit including C1 and C2 (see above) into the actuator P1 via the ring-around coil L during one complete sinusoidal halfwave, and the actuator P1 opens the non-illustrated injection valve.

The voltage source, the switched-mode power supply SNT, remains connected to the charge capacitor C1 so that the voltage source also feeds energy into the ring-around coil L.

After the polarity reversal, the charge switch X 1 at a step 50 is de-energized and the actuator P1 remains charged. A negative residual voltage (for example −10V), which is dependent on the capacitance and is necessary to be able to completely drain the actuator P1 again when discharging occurs, remains at the recharge capacitor C2.

The discharge switch X2 is triggered at a step 70 in order to discharge the actuator at the end of the control signal st (step 60). The discharge circuit closes via the inverse diode of the power MOSFET switch T1. The energy stored in the actuator returns to the capacitor C2 via the ring-around coil L, which capacitor C2 is charged, for example, to $U_{C2}$=+100V again and can be used for the following cycle. As soon as the actuator is discharged to the threshold voltage of the diode D that is in parallel with the "active" channel, the current that is still flowing continues via the diode, preventing the actuator from being charged to a negative voltage. Then, the discharge switch X2 is de-energized at step 80.

For the charge cycle of the next actuator, the losses that have occurred must initially be compensated. To this end, the voltage $U_{C2}$, which can be tapped at the negative pole −SNT of the switched-mode power supply SNT of the recharge capacitor C2 is measured at a step 90, and the switched-mode power supply SNT is set (regulated) to an output voltage value which corresponds to the difference between a desired value $U_s$=+160V and the measured voltage $U_{C2}$=100V. The charge capacitor C1 that is connected to the switched-mode power supply is accordingly recharged at a step 100 to the voltage $U_{c1}$. In this way, the full voltage $U_s$=+160V is available again at step 10 from the series circuit of the capacitors C1 and C2 for the next charging procedure.

If the device is actuated after a relatively long pause, the recharge capacitor C2 is initially discharged, and the charge capacitor C1 is charged to a maximum output voltage of the switched-mode power supply SNT, for example +75V. A transient response takes place, which lasts several charge cycles until the voltage at the recharge capacitor C2 which is returned during the discharging of the actuator reaches the assumed "steady-state" value $U_{C2}$=+100V after each ring-around process.

Figure 3:
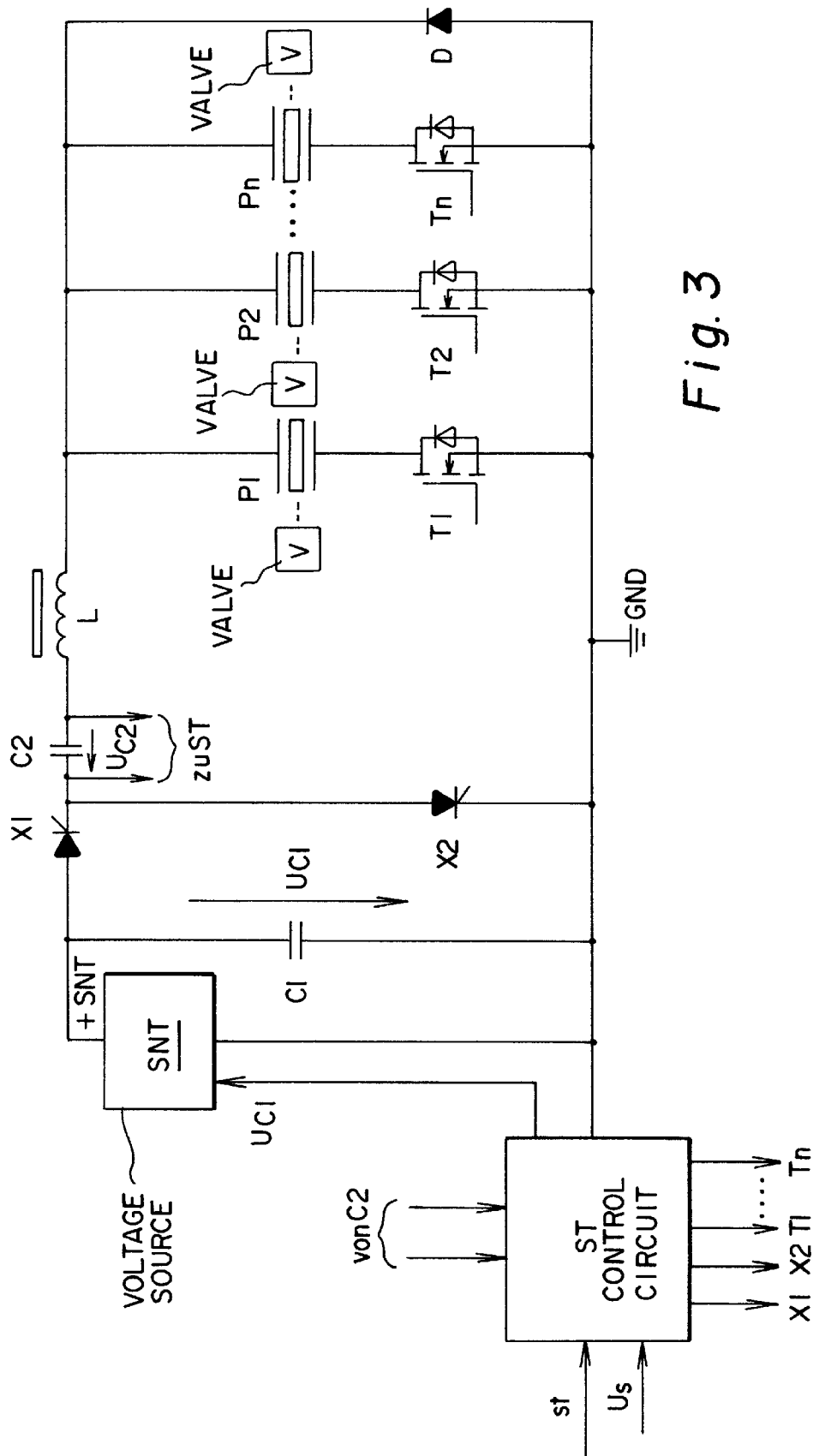
FIG. 3 is a circuit diagram of a second exemplary embodiment of the circuit.

The exemplary embodiment of the device according to FIG. 3, whose mode of operation corresponds completely to that of the device according to FIG. 1, differs from the exemplary embodiment according to FIG. 1 in only a small number of points. The difference is that here the negative pole of the switched-mode power supply SNT is connected to the earth connection GND of the circuit and that, accordingly, the recharge capacitor C2 is relocated to a space between the connection point of the charge switch X1 with the discharge switch X2 and the ring-around coil L.

The development of the switched-mode power supply is made easier with the reference potential at earth. With this circuit configuration, the discharge switch X2 is also given an earth connection, enabling it to be driven without an additional transformer.

We claim:

1. In combination with a control circuit, a device for driving at least one capacitive actuator and controlled by the control circuit, comprising:

an earth potential-free voltage source regulated by the control circuit and having a positive pole and a negative pole;

a charge capacitor disposed between said positive pole and said negative pole and being charged by said earth potential-free voltage source;

a first series circuit disposed in parallel with said charge capacitor and including a charge switch connected to said positive pole through which current can flow away from said positive pole and a discharge switch connected to said negative pole through which current can flow to said negative pole;

an earth connection;

a recharge capacitor disposed between said negative pole and said earth connection;

a ring-around coil having a first side connected to a node connection point of said charge switch and said discharge switch and a second side to be connected to an actuator to be driven;

a controlled power MOSFET switch having a first side connected to said earth connection and a second side to be connected to the actuator to be driven, said controlled power MOSFET switch and the actuator defining a second series circuit;

at least one further controlled power MOSFET having a first side connected to said earth connection and a second side to be connected to a first side of at least one further actuator, said second side of said ring-around coil to be connected to a second side of the at least one further actuator, said at least one further controlled power MOSFET switch and the at least one further actuator defining a third series circuit connected in parallel with said second series circuit; and a diode disposed between said second side of said ring-around coil and said earth connection and through which current can flow from said earth connection to said ring-around coil.

2. The device according to claim 1, wherein a node connection point of said negative pole serves as a voltage measuring point for a voltage applied to said recharge capacitor.

3. The device according to claim 1, wherein said earth potential-free voltage source regulated by the control circuit is a switched-mode power supply.

4. The device according to claim 1, wherein the control circuit is part of a microprocessor-controlled engine control unit.

5. The device according to claim 1, wherein said charge switch and said discharge switch are controlled, electronic switches through which current can flow in only one direction and have at least one semiconductor element.

6. The device according to claim 1, wherein said charge switch and said discharge switch are controlled, electronic switches through which current can flow in only one direction and have at least one semiconductor element.

7. A method for operating the device according to claim 1, which comprises:
charging a respective actuator via the ring-around coil with a prescribed desired voltage from a series circuit of the charge capacitor and of the recharge capacitor;
discharging the respective actuator into the recharge capacitor; and
charging the charge capacitor, before a next charge cycle, to a voltage level corresponding to a difference between a desired voltage and a voltage at the recharge capacitor.

8. In combination with a control circuit, a device controlled by the control circuit and driving a piezoelectrically operated fuel injection valve of an internal combustion engine, comprising:
an earth potential-free voltage source regulated by the control circuit and having a positive pole and a negative pole;
a charge capacitor disposed between said positive pole and said negative pole and being charged by said earth potential-free voltage source;
a first series circuit disposed in parallel with said charge capacitor and including a charge switch connected to said positive pole through which current can flow away from said positive pole and a discharge switch connected to said negative pole through which current can flow to said negative pole;
an earth connection;
a recharge capacitor disposed between said negative pole and said earth connection;
a second series circuit disposed between a node connection point of said charge switch and said discharge switch and said earth connection, said second series circuit including a ring-around coil having a first side and a second side, an actuator connected to said second side of said ring-around coil and driving the fuel injection valve, and a controlled power MOSFET switch connected to said actuator, said actuator connected in series with said controlled power MOSFET switch defining a third series circuit;
a fourth series circuit connected in parallel with said third series circuit, said fourth series circuit including at least one further controlled power MOSFET and at least one further actuator connected in series with said at least one further controlled power MOSFET; and
a diode disposed between said second side of said ring-around coil and said earth connection and through which current can flow from said earth connection to said ring-around coil.

9. In combination with a control circuit, a device controlled by the control circuit for driving at least one capacitive actuator, comprising:
a voltage source regulated by the control circuit and having a positive pole and an earth connection;
a charge capacitor disposed between said positive pole and said earth connection and being charged by said voltage source;
a first series circuit disposed in parallel with said charge capacitor and including a charge switch connected to said positive pole and through which current can flow away from said positive pole and a discharge switch having a first side connected to said charge switch and a second side connected to said earth connection and through which current can flow to said earth connection;
a ring-around coil having a first side and a second side;
a recharge capacitor disposed between a node connection point of said charge switch and said discharge switch and said first side of said ring-around coil;
a controlled power MOSFET switch having a first side connected to said earth connection and a second side to be connected to a first side of an actuator to be driven, a second side of the actuator to be connected to said second side of said ring-around coil, said controlled power MOSFET switch and the actuator defining a second series circuit;
at least one further controlled power MOSFET switch having a first side connected to said earth connection and a second side to be connected to a first side of at least one further actuator, a second side of the at least one further actuator to be connected to said second side of said ring-around coil; and
a diode connected between said earth connection and said second side of said ring-around coil and through which current can flow from said earth connection to said ring-around coil.

10. The device according to claim 9, wherein said voltage source regulated by the control circuit is a switched-mode power supply.

11. The device according to claim 9, wherein the control circuit is part of a microprocessor-controlled engine control unit.

12. A method for operating the device according to claim 7, which comprises:
charging a respective actuator via the ring-around coil with a prescribed desired voltage from a series circuit of the charge capacitor and of the recharge capacitor;
discharging the respective actuator into the recharge capacitor; and
charging the charge capacitor, before a next charge cycle, to a voltage level corresponding to a difference between a desired voltage and a voltage at the recharge capacitor.

13. In combination with a control circuit, a device for driving a piezoelectrically operated fuel injection valve of an internal combustion engine, comprising:
a voltage source regulated by the control circuit and having a positive pole and an earth connection;
a charge capacitor disposed between said positive pole and said earth connection and being charged by said voltage source;
a first series circuit disposed in parallel with said charge capacitor and including a charge switch connected to said positive pole and through which current can flow away from said positive pole and a discharge switch having a first side connected to said charge switch and a second side connected to said earth connection and through which current can flow to said earth connection;

second series circuit disposed between a node connection point of said charge switch and said discharge switch and said earth connection and including a recharge capacitor connected to said charge switch, a ring-around coil connected to said recharge capacitor, an actuator connected to said ring-around coil and a controlled power MOSFET switch connected to said actuator, said actuator connected in series with said controlled power MOSFET switch defining a third series connection;

a fourth series circuit connected in parallel with said third series circuit, said fourth series circuit including at least one further actuator and at least one further controlled power MOSFET switch connected in series with said at least one further actuator; and a diode connected between said earth connection and said ring-around coil and through which current can flow from said earth connection to said ring-around coil.

\* \* \* \* \*